Nov. 12, 1957  W. E. WHALEY  2,812,605
MOBILE SIGNS
Filed July 28, 1954  2 Sheets-Sheet 1
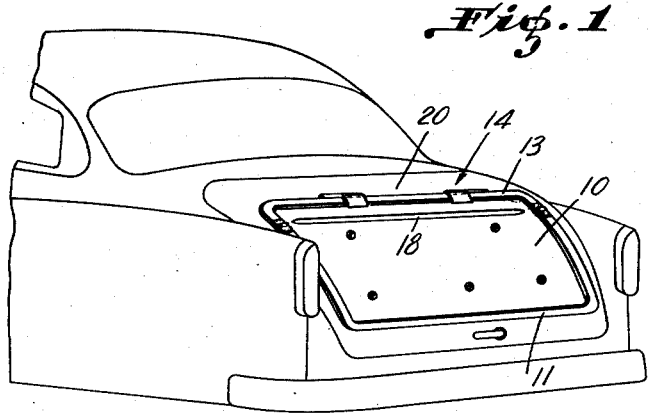
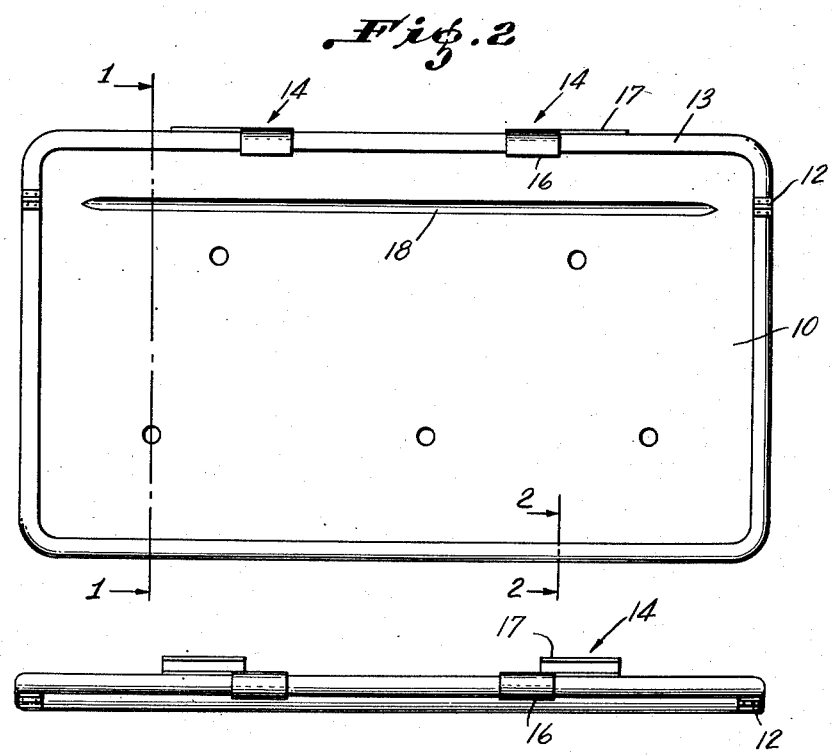
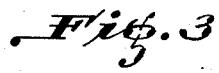
INVENTOR
WILLIAM E. WHALEY
BY
ATTORNEY Nov. 12, 1957 W. E. WHALEY 2,812,605
MOBILE SIGNS
Filed July 28, 1954 2 Sheets-Sheet 2
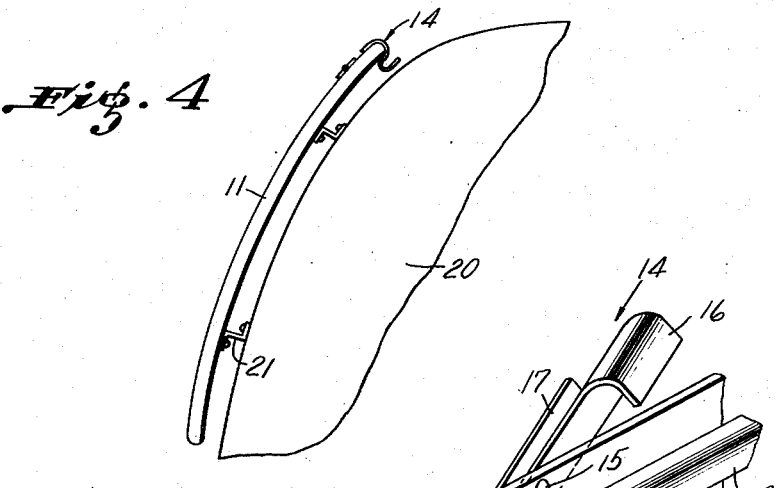
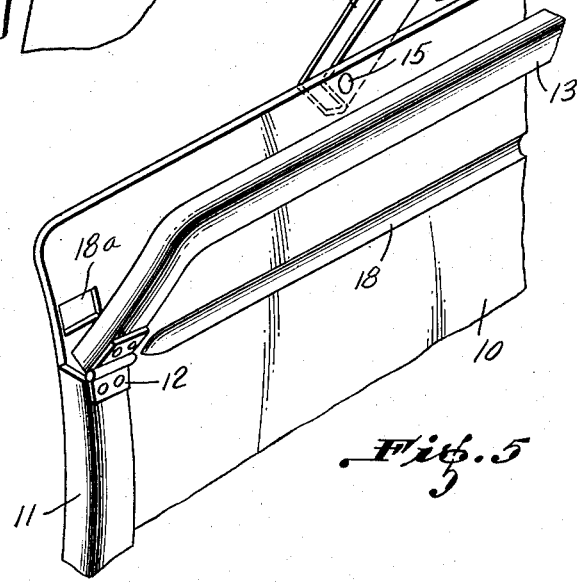
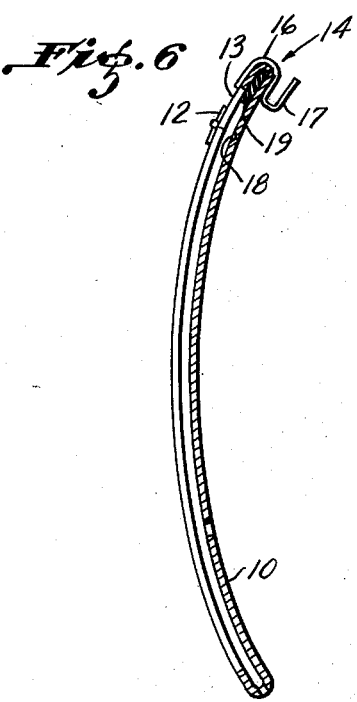
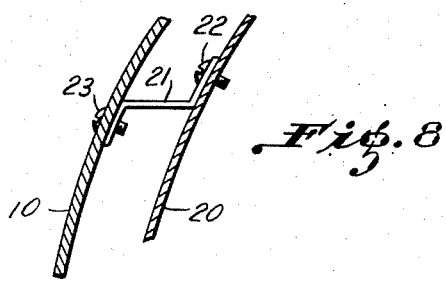
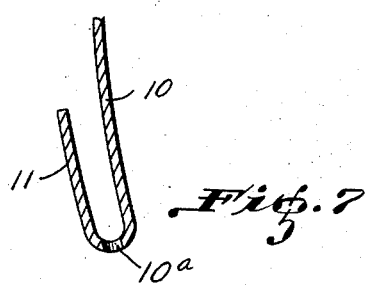
INVENTOR
WILLIAM E. WHALEY
BY
ATTORNEY

United States Patent Office 2,812,605
Patented Nov. 12, 1957

2,812,605

MOBILE SIGNS

William E. Whaley, Louisville, Ky.

Application July 28, 1954, Serial No. 446,299

1 Claim. (Cl. 40—129)

My invention relates to improvements in mobile signs, and has to do, more particularly, with the provision of a display card holder adapted for direct attachment to a body panel of an automobile of the passenger type.

The sales-effectiveness of taxicab poster advertising has resulted in widespread adoption of this medium of advertising. For the most part, the posters heretofore in use upon taxicabs have been structurally incorporated with, or supported by, a member which serves as a cover for the spare tire of the vehicle. During the past several years, however, the mounting of spare tires upon the exterior of passenger vehicles has become obsolete and, accordingly, this instrumentality has become unavailable as a post support.

Advertising posters of a type most suitable for taxicab use consist of a stiff paperboard card lithographed in a plurality of contrasting colors. While quite resistant to moisture by reason of their calendered and lithographed nature, such cards have limitations in respect to edge wetting and buckling stresses caused by variant air pressures induced by vehicle travel. Installation cost, reduction of vehicle body damage to a minimum, resistance to destruction by minor traffic accidents and road vibrations, lightness in weight, facile card replaceability, silence and freedom from rattles, adaptability to body panels of various sizes and curvatures, and adjustability to assure maximum visibility without card glare or shadow are factors which must be successfully dealt with to attain practicability in a device of this general nature.

The present invention, as embodied in the structural form hereinafter disclosed, has, as its desideratum, the solution of the foregoing problems in mobile signs of this general type and is characterised by the attainment of certain well-defined objects. It is a primary object of my invention to provide a post-card holder of the class described which, made in a single standard size and form, is inherently adaptable for securement to, and support upon, any of the vast number of sizes and shapes of conventional automobile bodies of the passenger type.

It is also a salient object of my invention to provide a post-card holder for taxicab use which, though light in weight, is durable even under the severe conditions of road vibration and abuse encountered in vehicles operated for hire.

It is an object of my invention, also, to provide a poster-card holder of the class set forth which is protective of the card, serving to shield the edges thereof much if not all of the moisture insident to outdoor exposure.

It is an object of my invention to provide a poster-card holder of the class described which, though closely fitted to the supporting vehicle body panel, permits of facile card replacement.

Further objects, and objects relating to details and economies of construction and installation will more definitely appear from the description to follow. In one instance, I accomplish the objects of my invention by the means and method set forth in the following specification. My invention is clearly defined by the appended claim. A structure constituting a preferred embodiment of my invention is illustrated in the accompanying drawings, in which:

Figure 1 is a rear perspective view of the lower portion of an automobile, the body of which is provided with a built-in luggage compartment, upon the door of which luggage compartment is mounted a sign carrier constituting one preferred embodiment of my invention;

Figure 2 is a front elevational view of the sign carrier detached from the automobile body panel;

Figure 3 is a top plan view of the sign carrier depicted in Figure 2;

Figure 4 is a side elevational view, partly broken away, showing the sign carrier mounted on the luggage compartment door;

Figure 5 is a detailed perspective view, partly broken away and on an enlarged scale, of the gate of the carrier;

Figure 6 is a sectional view taken on line 1—1 of Figure 2;

Figure 7 is a vertical sectional view, on an enlarged scale, taken on line 2—2 of Figure 2 and showing drainage slots; and Figure 8 is a sectional view on an enlarged scale, showing the means for attaching the card holder to the luggage compartment door.

Throughout the several views, the same reference numerals refer to the same parts.

In a broad sense, the several concepts of my invention may be said to find embodiment of a poster-card holder for automobile vehicles which consist of a generally rectangular panel having its periphery turned in, as by stamping, to form an integral annular frame of channel cross-section adapted snugly to receive a narrow marginal portion of the paperboard display card, and provided with a breakout outboard section through the opening of which a card replacement is possible. Mounting means, in accordance with the invention are widely adjustable in an inboard-outboard direction with respect to the plane of the card holder, whereby the frame may be employed upon body panels having various curvatures relative to the general plane of mounting for the frame, and whereby the frame and its supported card may be inclined, with respect to the vertical, to insure good visibility without the creation of glare or shadow effects in the card. While the snugness of assembly of card and frame presents, to a large extent, access of precipitated moisture to the card edges, means are provided, in my frame construction, for protecting the bottom edge of the card against such moisture as may tend to accumulate in the frame.

Referring to the construction illustrated in the accompanying drawings, my invention preferably, though not exclusively, finds structural embodiment in a substantially rectangular, slightly curved panel 10 whose peripheries are turned in upon themselves, as at 11, by a stamping or like operation, to form an annular frame of channel cross-section integral with the panel 10. The top of the panel and integral frame is provided with a breakout portion hinged as at 12 to provide a gate 13. Latching means are provided for the gate 13 consisting of lever members 14 hinged on the panel 10 as at 15. These latching means are provided, as shown more particularly in Figure 5, with a turned in gate engaging portion 16 and a hand or finger gripping portion 17.

The rear of the panel 10 is provided with bracing means consisting conveniently of a stamped channel or groove 18.

Poster-cards of the type intended for use in my holder are by dictate of commercial expediency of inexpensive paperboard construction. While the faces of such cards are quite weather-resistant due to the calendered character thereof and, in the case of the front face, to the lithographing thereon, the marginal edges thereof are relatively moisture-absorbent and cannot be readily and cheaply waterproofed by impregnation with a sealing compound. I have found that such a card, snugly marginally received in a frame of channel cross-section is adequately protected thereby along its top and side edges, but suffers injury along its bottom edge by reason of ingress of water which tends to accumulate in the lower portion of the frame. I have avoided this problem, in the disclosure frame construction, by drainage of the channel through a multiplicity of drainage slots 10a formed in the bight portion of the lower channel section. Even where the sign is substantially inclined with respect to the vertical, such moisture as accumulates in the lower channel section of the frame gravitates readily, and is drained through the slots. A strip of rubber or like resilient material 19 is mounted along the inner top surface of the gate 13 substantially the entire width thereof to insure a snug fit of the poster-card in the holder. Apertures 18a are provided as shown to provide finger holes whereby cards are more easily removed from the holder.

Bodies of modern passenger automobiles vary widely in size and configuration and the panels which comprise these bodies are generally curved in several directions. Particularly is this so in the case of automobiles having a built-in luggage compartment provided, as are illustrated, with a rear panel 20 which is hinged to the body and constitutes a luggage compartment door.

My poster-card carrier is especially well suited for mounting upon body panels of this general type, although not limited thereto, and is inherently adaptable to a wide range of structure, shape and size therein, as will appear.

The mode of application and the novel function features of the above described construction should be readily apparent. Assuming, as illustrated, that the device is to be installed upon a body panel of the type shown generally in Figures 1 and 4, the optimum locations for perforations on the rear automobile panel 20 are first determined and then the perforations are drilled into the panel. Then corresponding perforations are drilled into the panel 10 of the poster-card holder. Assuming that the perforations in the panel 20 have been drilled to overlie corresponding perforations in the panel 10, the assembling portion is as follows, reference being had particularly to Figures 4 and 8 of the drawing: Z brackets 21 are mounted on panel 20 by means of bolts 22. Then panel 10 is mounted on Z brackets 21 by means of similar bolts 23.

A wide degree of adjustment with respect to the inboard-outboard direction may be accomplished through the use of various sized Z brackets. This is a salient feature of my invention.

The mode of installation of the card within the frame is extremely simple. The portion 17 of the latching means is pulled in a vertical direction and then the gate 13 is swung outwardly. The card may then be inserted down into the card holder by a simple vertical sliding action. After insertion of the card the gate 13 is closed and maintained upon the front surface of the card by the locking means and rubber strip 19. In removing the card it is desirable to first obtain a firm grip upon the card by first inserting a finger through the hole 18a to dislodge the card in the event that it may have become stuck, so to speak, in the channel sections.

I am aware that my invention is susceptible of embodiment in various structural forms and that those skilled in the art, upon familiarization with the basic concepts herein disclosed, may, for purposes of structural simplicity or cheapening the cost of manufacture, find it expedient to make various structural changes therein. I, therefore, claim as my invention broadly as indicated by the appended claim:

A poster-card holder for automotive vehicles, comprising, a relatively rigid, generally rectangular, main frame curving slightly from top to bottom and having its periphery turned in to form an integral annular frame of channel cross section adapted to snugly receive a poster-card, the top portion of said main frame being provided with a breakout gate section of channel shape connected to the main frame on each side thereof by longitudinal hinges adjacent the top portion, for opening swinging movement outwardly from said main frame, a rubber strip mounted on the inner top surface of said gate section to securely hold a poster-card in the main frame, locking lever means for securing the gate section in closed position on the main frame, and adjustable opened Z-shaped bracket means on the back face of said main frame for resiliently securing the main frame in cooperative spaced relation to automobile luggage compartment lids of various curvatures.

References Cited in the file of this patent
UNITED STATES PATENTS

| | | |
|---|---|---|
| 1,501,198 | Brockman | July 15, 1924 |
| 1,567,337 | Siever | Dec. 29, 1925 |
| 1,633,785 | Hotchner | June 28, 1927 |
| 1,742,667 | Purdy et al. | Jan. 7, 1930 |
| 1,792,701 | Overholtz | Feb. 17, 1931 |
| 1,805,742 | Reynolds | May 19, 1931 |
| 2,496,763 | Whaley | Feb. 7, 1950 |
| 2,504,639 | Bruns | Apr. 18, 1950 |
| 2,753,640 | McConnell | July 10, 1956 |